April 2, 1929. R. B. BUKOLT 1,707,902
BRAKE MECHANISM
Original Filed July 20, 1925
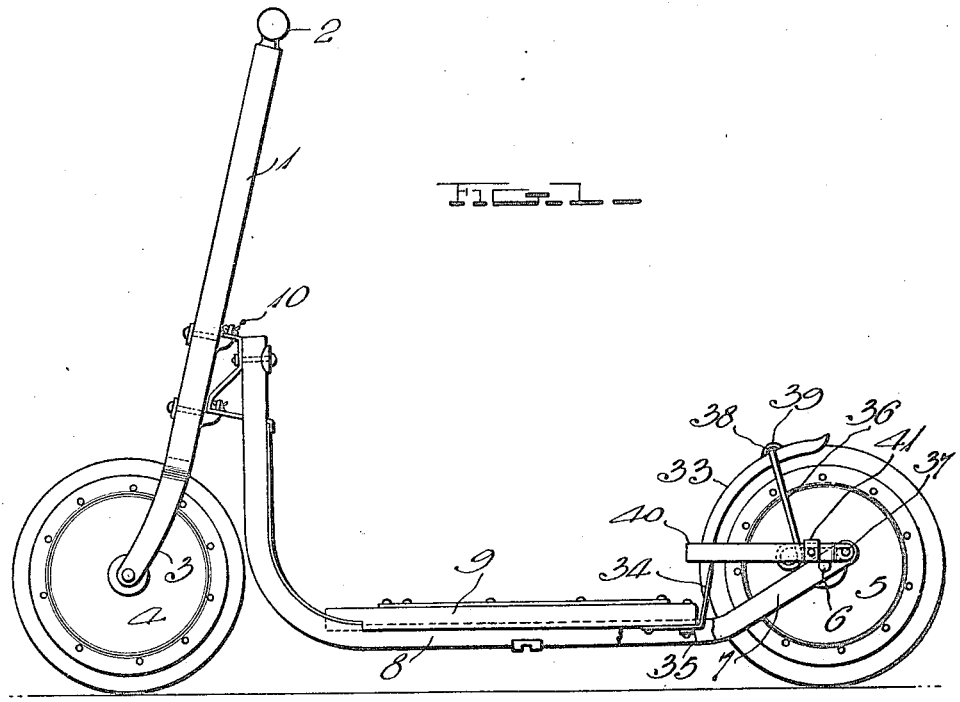
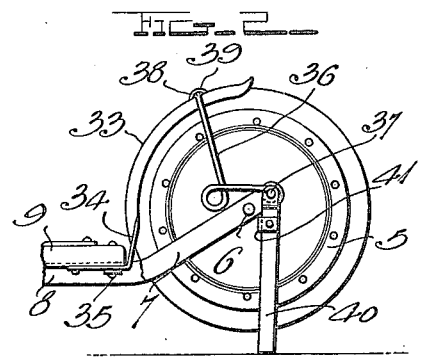
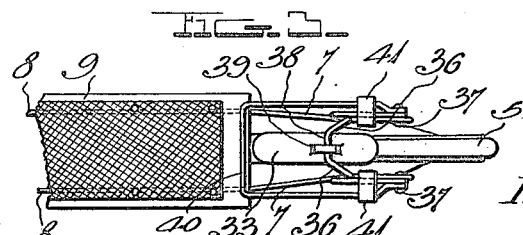
Inventor
R. B. Bukolt
Witness
H. Woodard
By
Attorneys Patented Apr. 2, 1929.

1,707,902

UNITED STATES PATENT OFFICE.

ROMAN B. BUKOLT, OF STEVENS POINT, WISCONSIN.

BRAKE MECHANISM.

Original application filed July 20, 1925, Serial No. 44,845. Divided and this application filed November 9, 1925. Serial No. 67,993.

This application is a division of my pending United States application Serial No. 44,845, filed July 20, 1925 for improvements in scooters, and the present case is devoted to the brake mechanism.

The scooter herein disclosed is of the general type in which a combined brake actuator and stand is utilized either to depress a combined fender and brake, or to support the rear end of the vehicle when not in use. It is the object of the invention to provide a new and improved relation of springs and lugs, the former being connected to the combined fender and brake for normally elevating it, while the lugs are carried by the combined actuator and stand for engagement either with portions of the springs to effect brake-application, or for contact with portions of the scooter frame to hold the combined actuator and stand in its scooter-supporting position.

Another object is to provide a construction which may be easily and inexpensively manufactured, yet will be highly efficient and desirable.

With the foregoing in view, the invention resides in the novel subject matter hereinafter described and claimed, the description being supplemented by the accompanying drawing.

Figure 1 is a side elevation of a scooter embodying the invention, the combined brake actuator and stand being shown in brake-actuating position.

Figure 2 is a fragmentary side elevation showing the combined brake actuator and stand in position for supporting the rear end of the scooter.

Figure 3 is a top plan view of the rear portion of the scooter, the parts being located as shown in Fig. 1.

The drawing above briefly described may be considered as disclosing the preferred form of the invention, but it is to be understood that although the structural details shown, will be hereinafter specifically described, the invention is not restricted to such details.

The numeral 1 designates a steering column embodying a handle 2, a fork 3 and a front wheel 4, the latter being preferably rubber-tired and mounted on roller bearings. A similar wheel 5 is provided at the rear end of the scooter and the axle 6 of this wheel 5 supports the inclined rear ends 7 of a pair of longitudinal frame bars 8 which underlie and support a footboard 9. The front ends of the bars 8 turn upwardly and are pivotally connected at 10 to the steering column 1 in any preferred manner.

The general assembly of parts so far described, constitutes no part of the present invention, except in association with the features of novelty now to be described.

I have provided a combined fender and brake 33 for the rear wheel 5, this member being of a longitudinally curved, channel-shaped formation and having its lower end 34 suitably secured as at 35 against the bottom of the foot-board 9, said lower end being resilient so that it permits downward swinging of the member 33 into contact with the tire of the wheel 5, when it is to be used as a brake. A pair of substantially L-shaped springs 36 are provided at opposite sides of the wheel 5, the lower ends of said springs being connected with the rear extremities 7 of the bars 8, by appropriate fasteners 37, while their upper ends are connected with the combined fender and brake 33. Preferably, the two springs 36 are formed by bending a single piece of spring wire, and the portion 38 of this wire which connects said springs 36, may well pass through an upwardly stamped portion 39 of the member 33, to establish connection between said member and the springs. These springs are instrumental in normally holding the member 33 out of contact with the tire of the wheel 5, but they also form part of operating means for depressing said member into contact with the tire.

A U-shaped, combined brake actuator and stand 40, has its ends pivoted to the terminals 7 of the bars 8, the fasteners 37 being preferably utilized to establish these pivotal connections. This member 40 is swingable to either of the positions shown in Figs. 1 and 2, and it is provided with a pair of lugs 41. When the member 40 is horizontally disposed as in Fig. 1, these lugs rest upon the horizontal portions of the springs 36 and the front end of said member is then in position to be depressed by one foot of the person using the scooter. When so depressed, the lugs 41 shift the springs 36 downwardly, thus pulling the combined fender and brake 33 against the tire of the wheel 5 and forming an effective brake. When the member 40 is swung to the position of Fig. 2, the lugs 41 abut the bar ends 7 and said member then forms an effective stand for supporting the entire scooter in a vertical position.

Excellent results have been obtained from the details disclosed and they are therefore preferably followed. However, within the scope of the invention as claimed, numerous modifications may be made, and obviously any desired materials and ornamentations may be used.

I claim:

1. The combination with a scooter having a body and a rear wheel; of a combined fender and brake for said wheel connected to the body, a pair of L-shaped springs connected at their upper ends to said combined fender and brake and connected at their lower ends with the body, and a U-shaped combined brake actuator and stand having its arms pivoted to the body, said combined actuator and stand having lugs engageable with the horizontal portions of said springs when in brake-actuating position, the same lugs being engageable with the body when said combined brake actuator and stand is in stand-forming position.

2. The combination with a scooter having a body, a rear wheel and rearwardly projecting fork arms secured to the body, supported by said wheel and disposed at opposite sides of the latter; of a combined fender and brake for said rear wheel resiliently connected at its front end with the rear end of said body, an arched rod of spring metal straddling said combined fender and brake and said wheel and having its crown secured to the former, the lower portions of the ends of said rod being coiled, extended rearwardly from the coils and pivoted to the rear extremities of said fork arms, and a U-shaped combined brake actuator and stand having its arms pivoted to said rear extremities of said fork arms, said combined actuator and stand having inwardly projecting lugs on said arms thereof positioned for contact with the upper sides of said rearwardly extending portions of the resilient rod when said combined actuator and stand is in brake-actuating position, the same lugs being positioned to strike the lower edges of said fork arms when said combined brake actuator and stand is in stand-forming position.

In testimony whereof I have hereunto affixed my signature.

ROMAN B. BUKOLT.